(12) United States Patent
Attar et al.

(10) Patent No.: US 12,254,644 B2
(45) Date of Patent: Mar. 18, 2025

(54) IMAGING SYSTEM AND METHOD

(71) Applicant: Ernst Leitz Labs LLC, Bellevue, WA (US)

(72) Inventors: Ziv Attar, Los Altos, CA (US); George Douglas MacEwen, Mountain View, CA (US)

(73) Assignee: LEICA CAMERA AG (DE)

( * ) Notice: Subject to any disclaimer, the term of this patent is extended or adjusted under 35 U.S.C. 154(b) by 414 days.

(21) Appl. No.: 17/705,674

(22) Filed: Mar. 28, 2022

(65) Prior Publication Data

US 2022/0319026 A1 Oct. 6, 2022

Related U.S. Application Data

(60) Provisional application No. 63/168,757, filed on Mar. 31, 2021.

(51) Int. Cl.
*G06T 7/55* (2017.01)
*G06T 3/4053* (2024.01)
*G06T 5/50* (2006.01)

(52) U.S. Cl.
CPC .............. *G06T 7/55* (2017.01); *G06T 3/4053* (2013.01); *G06T 5/50* (2013.01); *G06T 2207/20221* (2013.01); *G06T 2207/20228* (2013.01)

(58) Field of Classification Search
None
See application file for complete search history.

(56) References Cited

U.S. PATENT DOCUMENTS

| 6,480,192 B1 | 11/2002 | Sakamoto |
| 7,099,555 B2 | 8/2006 | Onuki |
| 7,206,443 B1 * | 4/2007 | Duvdevani ............. G06F 18/40 382/199 |

(Continued)

FOREIGN PATENT DOCUMENTS

| AU | 2015258346 A1 | 6/2017 |
| AU | 2016273979 A1 | 7/2018 |

(Continued)

OTHER PUBLICATIONS

European Search Report dated Aug. 9, 2022 for European Patent Application No. 22 16 5365.

(Continued)

*Primary Examiner* — Jiangeng Sun
(74) *Attorney, Agent, or Firm* — Fishman Stewart PLLC

(57) ABSTRACT

In exemplary illustrative embodiments, a method of generating a digital image and/or modified depth information may include obtaining, via a first electronic sensor, a plurality of images of a target within a time period; selecting one or more pixels in a first image of the plurality of images; identifying corresponding pixels, that correspond to the one or more selected pixels, in one or more other images of the plurality of images, the one or more selected pixels and the corresponding pixels defining sets of reference pixels; identifying two or more images of the plurality of images having respective sets of reference pixels with optimal disparity; generating modified depth information; and/or generating a final digital image via the plurality of images and the modified depth information.

13 Claims, 10 Drawing Sheets
(4 of 10 Drawing Sheet(s) Filed in Color)

(56) References Cited

U.S. PATENT DOCUMENTS

| | | |
|---|---|---|
| 7,911,513 B2 | 3/2011 | Garrison |
| 7,920,172 B2 | 4/2011 | Chanas |
| 8,169,672 B2 | 5/2012 | Yamauchi |
| 8,366,003 B2 | 2/2013 | Mohan |
| 8,615,140 B2 | 12/2013 | Tin |
| 8,723,912 B2 | 5/2014 | Michrowski |
| 8,988,592 B2 | 3/2015 | Takahashi |
| 8,989,517 B2 | 3/2015 | Morgan-Mar et al. |
| 8,994,847 B2 | 3/2015 | Chen et al. |
| 9,087,405 B2 | 7/2015 | Seitz et al. |
| 9,118,846 B2 | 8/2015 | Ma et al. |
| 9,134,588 B2 | 9/2015 | Shibasaki |
| 9,143,693 B1 | 9/2015 | Zhou et al. |
| 9,232,131 B2 | 1/2016 | Kawarada |
| 9,237,277 B1 | 1/2016 | Gulliver |
| 9,256,928 B2 | 2/2016 | Umeda et al. |
| 9,305,375 B2 | 4/2016 | Akeley |
| 9,311,901 B2 | 4/2016 | Webster et al. |
| 9,325,891 B2 | 4/2016 | Shuster |
| 9,360,671 B1 | 6/2016 | Zhou |
| 9,361,669 B2 | 6/2016 | Murasawa et al. |
| D765,133 S | 8/2016 | Joo et al. |
| D765,720 S | 9/2016 | Joo et al. |
| 9,451,216 B2 | 9/2016 | Nobayashi |
| 9,479,754 B2 | 10/2016 | Tang et al. |
| 9,528,687 B1 | 12/2016 | Kress et al. |
| 9,547,907 B2* | 1/2017 | Somanath .............. G06T 7/194 |
| 9,554,037 B2 | 1/2017 | Lee |
| 9,594,534 B2 | 3/2017 | Sasaki et al. |
| 9,621,786 B2 | 4/2017 | Takahashi |
| 9,621,793 B2 | 4/2017 | Furihata et al. |
| 9,639,948 B2 | 5/2017 | Morgan-Mar et al. |
| 9,671,675 B2 | 6/2017 | Kamo |
| 9,723,204 B2 | 8/2017 | Wilensky et al. |
| 9,734,551 B1 | 8/2017 | Esteban et al. |
| 9,736,348 B2 | 8/2017 | Corcoran |
| 9,739,986 B2 | 8/2017 | Wakazono et al. |
| 9,759,549 B2 | 9/2017 | Nobayashi |
| 9,813,615 B2 | 11/2017 | Lee et al. |
| 9,848,117 B2 | 12/2017 | Ishii |
| 9,871,586 B2 | 1/2018 | De Bruijn et al. |
| 9,872,012 B2 | 1/2018 | Paramonov et al. |
| 9,961,228 B2 | 5/2018 | Uno |
| 10,049,477 B1 | 8/2018 | Kokemohr et al. |
| 10,070,052 B2 | 9/2018 | Fukui |
| 10,070,068 B2 | 9/2018 | Matsuoka |
| 10,089,770 B2 | 10/2018 | Kobayashi |
| 10,108,833 B2 | 10/2018 | Hong et al. |
| 10,116,865 B2 | 10/2018 | Uekusa et al. |
| 10,120,267 B2 | 11/2018 | Bonnier et al. |
| 10,127,639 B2 | 11/2018 | Miura et al. |
| 10,261,293 B2 | 4/2019 | Sanjo |
| 10,270,983 B1 | 4/2019 | Van Os et al. |
| 10,284,835 B2 | 5/2019 | Bishop et al. |
| 10,341,632 B2 | 7/2019 | Pang et al. |
| 10,347,296 B2 | 7/2019 | An |
| 10,380,650 B2 | 8/2019 | Hamedi et al. |
| 10,382,665 B2 | 8/2019 | Sa et al. |
| 10,438,067 B2 | 10/2019 | Miyazaki |
| 10,444,967 B2 | 10/2019 | Burns et al. |
| 10,459,481 B2 | 10/2019 | Pantel |
| 10,460,505 B2 | 10/2019 | Overbeck |
| 10,469,873 B2 | 11/2019 | Pang et al. |
| 10,482,583 B1 | 11/2019 | Suszek |
| 10,506,175 B2 | 12/2019 | Park et al. |
| 10,510,136 B2 | 12/2019 | Zhang |
| 10,528,243 B2 | 1/2020 | Manzari et al. |
| 10,545,413 B2 | 1/2020 | Takeshita et al. |
| 10,554,890 B1 | 2/2020 | Le et al. |
| 10,567,464 B2 | 2/2020 | Pang et al. |
| 10,616,490 B2 | 4/2020 | Bernstein et al. |
| 10,645,294 B1 | 5/2020 | Manzari |
| 10,674,072 B1 | 6/2020 | Manzari et al. |
| 10,706,328 B2 | 7/2020 | Stumpe et al. |
| 10,742,892 B1 | 8/2020 | Le et al. |
| 10,775,505 B2 | 9/2020 | Valouch et al. |
| 10,775,614 B1 | 9/2020 | Gross |
| 10,823,818 B2 | 11/2020 | Send et al. |
| 10,860,919 B2 | 12/2020 | Kanazawa et al. |
| 10,872,420 B2 | 12/2020 | Shukla et al. |
| 10,873,694 B2 | 12/2020 | Nakamura |
| 10,877,266 B2 | 12/2020 | Solomon |
| 10,885,690 B2 | 1/2021 | Kaida |
| 10,904,370 B1 | 1/2021 | Fournier et al. |
| 10,904,418 B2 | 1/2021 | Agrawal et al. |
| 10,904,425 B2 | 1/2021 | Kawarada |
| 10,909,707 B2 | 2/2021 | Ciurea |
| 11,057,553 B2 | 7/2021 | Yadav et al. |
| 11,403,509 B2 | 8/2022 | Donsbach et al. |
| 2002/0038510 A1* | 4/2002 | Savareigo .......... G01N 21/8851 29/846 |
| 2004/0070753 A1* | 4/2004 | Sugihara .......... G01N 21/95607 250/306 |
| 2005/0282208 A1* | 12/2005 | Adams ................ G06V 20/695 435/325 |
| 2007/0223817 A1* | 9/2007 | Ulrich .................... G06F 18/28 382/199 |
| 2007/0258706 A1 | 11/2007 | Raskar |
| 2008/0239316 A1* | 10/2008 | Gharib ................... H04N 25/00 356/601 |
| 2009/0262439 A1 | 10/2009 | Yoneyama |
| 2010/0309362 A1 | 12/2010 | Nagata |
| 2011/0149118 A1 | 6/2011 | Misaka |
| 2011/0242367 A1 | 10/2011 | Lee |
| 2011/0242372 A1 | 10/2011 | Kosaka |
| 2011/0280475 A1 | 11/2011 | Singhal |
| 2012/0123718 A1* | 5/2012 | Ko ......................... G01C 25/00 702/85 |
| 2012/0262594 A1 | 10/2012 | Koizumi |
| 2013/0002932 A1 | 1/2013 | Guenter |
| 2013/0010184 A1 | 1/2013 | Lee |
| 2013/0022290 A1 | 1/2013 | Hori |
| 2013/0051663 A1 | 2/2013 | Krishnaswamy |
| 2013/0124999 A1 | 5/2013 | Agnoli |
| 2013/0229435 A1 | 9/2013 | Intwala |
| 2014/0003732 A1 | 1/2014 | Le Floch |
| 2014/0125660 A1* | 5/2014 | Redmann ................ G06T 15/04 345/419 |
| 2014/0192163 A1 | 7/2014 | Shimizu |
| 2014/0205023 A1* | 7/2014 | Girdzijauskas ...... H04N 19/597 375/240.27 |
| 2014/0323142 A1 | 10/2014 | Rodriguez et al. |
| 2015/0001664 A1* | 1/2015 | Van Der Tempel ........................ H01L 27/14612 257/432 |
| 2015/0015773 A1 | 1/2015 | Tulyakov et al. |
| 2015/0077826 A1 | 3/2015 | Beckman |
| 2015/0116542 A1 | 4/2015 | Lee |
| 2015/0178970 A1 | 6/2015 | Pham |
| 2015/0234865 A1 | 8/2015 | Iida |
| 2015/0279033 A1 | 10/2015 | Murakami |
| 2015/0302592 A1* | 10/2015 | Bruls ....................... G06T 7/50 348/44 |
| 2015/0310613 A1 | 10/2015 | Murakami |
| 2016/0028949 A1 | 1/2016 | Lee et al. |
| 2016/0035068 A1 | 2/2016 | Wilensky et al. |
| 2016/0054549 A1 | 2/2016 | Takemoto |
| 2016/0063669 A1 | 3/2016 | Wilensky et al. |
| 2016/0119606 A1 | 4/2016 | Horikawa |
| 2016/0155235 A1 | 6/2016 | Miyatani et al. |
| 2016/0212315 A1 | 7/2016 | Watanabe |
| 2016/0283097 A1 | 9/2016 | Voss |
| 2016/0301936 A1 | 10/2016 | Chen et al. |
| 2016/0307368 A1 | 10/2016 | Akeley et al. |
| 2016/0307372 A1 | 10/2016 | Pitts et al. |
| 2016/0360109 A1 | 12/2016 | Laroia et al. |
| 2016/0364129 A1 | 12/2016 | McLean et al. |
| 2017/0070720 A1 | 3/2017 | Bishop |
| 2017/0070731 A1 | 3/2017 | Darling et al. |
| 2017/0091906 A1 | 3/2017 | Liang et al. |
| 2017/0094243 A1* | 3/2017 | Venkataraman .......... G06T 1/20 |
| 2017/0148142 A1 | 5/2017 | Park |
| 2017/0178298 A1 | 6/2017 | Bonnier et al. |

(56) References Cited

U.S. PATENT DOCUMENTS

| | | |
|---|---|---|
| 2017/0230579 A1 | 8/2017 | Wakazono |
| 2017/0316602 A1* | 11/2017 | Smirnov .............. H04N 13/111 |
| 2017/0351113 A1 | 12/2017 | Inoue et al. |
| 2017/0359505 A1 | 12/2017 | Manzari et al. |
| 2017/0374269 A1* | 12/2017 | Govindarao ......... H04N 23/959 |
| 2018/0020204 A1 | 1/2018 | Pang et al. |
| 2018/0048797 A1 | 2/2018 | Laroia |
| 2018/0067312 A1 | 3/2018 | Zhou et al. |
| 2018/0089903 A1 | 3/2018 | Pang et al. |
| 2018/0101980 A1 | 4/2018 | Kwon et al. |
| 2018/0120932 A1 | 5/2018 | Sengelaub et al. |
| 2018/0164964 A1 | 6/2018 | Hori et al. |
| 2018/0165521 A1 | 6/2018 | Yamamoto et al. |
| 2018/0270445 A1 | 9/2018 | Khandelwal et al. |
| 2018/0275410 A1 | 9/2018 | Yeoh et al. |
| 2018/0295340 A1* | 10/2018 | Varekamp ................. G06T 5/70 |
| 2018/0350043 A1 | 12/2018 | Seely et al. |
| 2018/0356617 A1 | 12/2018 | Yamada et al. |
| 2019/0096096 A1 | 3/2019 | Randall et al. |
| 2019/0096298 A1 | 3/2019 | Mori et al. |
| 2019/0113721 A1 | 4/2019 | Katayose |
| 2019/0163768 A1 | 5/2019 | Gulati et al. |
| 2019/0191091 A1 | 6/2019 | Kawanishi |
| 2019/0206025 A1 | 7/2019 | Taoka et al. |
| 2019/0243533 A1 | 8/2019 | Imamiya |
| 2019/0244362 A1 | 8/2019 | Movshovitz-Attias et al. |
| 2019/0279379 A1 | 9/2019 | Srinivasan et al. |
| 2019/0279387 A1* | 9/2019 | Liu .......................... G06T 7/194 |
| 2019/0297256 A1 | 9/2019 | Jun et al. |
| 2019/0302399 A1 | 10/2019 | Nakamura et al. |
| 2019/0304112 A1 | 10/2019 | Hota et al. |
| 2019/0313007 A1 | 10/2019 | Kim |
| 2019/0325561 A1 | 10/2019 | Anilkumar et al. |
| 2019/0342544 A1 | 11/2019 | Hayasaka |
| 2019/0361228 A1 | 11/2019 | Sugawa |
| 2020/0007779 A1 | 1/2020 | Ogawa |
| 2020/0007854 A1 | 1/2020 | Ogawa et al. |
| 2020/0014831 A1 | 1/2020 | Yadav et al. |
| 2020/0020085 A1 | 1/2020 | Pekkucuksen et al. |
| 2020/0036895 A1 | 1/2020 | Midorikawa et al. |
| 2020/0051218 A1 | 2/2020 | Hyun et al. |
| 2020/0051265 A1 | 2/2020 | Kim et al. |
| 2020/0065942 A1 | 2/2020 | Hiasa |
| 2020/0082535 A1 | 3/2020 | Lindskog |
| 2020/0082599 A1 | 3/2020 | Manzari |
| 2020/0104034 A1 | 4/2020 | Lee et al. |
| 2020/0105003 A1 | 4/2020 | Stauber et al. |
| 2020/0106952 A1 | 4/2020 | Missig et al. |
| 2020/0134827 A1 | 4/2020 | Saha et al. |
| 2020/0134840 A1 | 4/2020 | Mitsumoto |
| 2020/0134848 A1 | 4/2020 | El-Khamy et al. |
| 2020/0160533 A1 | 5/2020 | Du et al. |
| 2020/0177869 A1 | 6/2020 | Choi et al. |
| 2020/0186710 A1 | 6/2020 | Sheikh et al. |
| 2020/0186721 A1 | 6/2020 | Ogawa |
| 2020/0213511 A1 | 7/2020 | Suzuki et al. |
| 2020/0221103 A1 | 7/2020 | Kim et al. |
| 2020/0242788 A1 | 7/2020 | Jacobs et al. |
| 2020/0265564 A1 | 8/2020 | Suwa |
| 2020/0265565 A1 | 8/2020 | Hwang et al. |
| 2020/0265603 A1 | 8/2020 | Yim et al. |
| 2020/0267295 A1 | 8/2020 | Lee et al. |
| 2020/0288051 A1 | 9/2020 | Suwa |
| 2020/0294198 A1 | 9/2020 | Yamanaka |
| 2020/0314330 A1 | 10/2020 | Takayama |
| 2020/0314331 A1 | 10/2020 | Ouchi |
| 2020/0322544 A1 | 10/2020 | Jung et al. |
| 2020/0326754 A1 | 10/2020 | Kim et al. |
| 2020/0327685 A1 | 10/2020 | Ren et al. |
| 2020/0329178 A1 | 10/2020 | Moon et al. |
| 2020/0372626 A1* | 11/2020 | Dal Mutto ............ G06T 7/0002 |
| 2020/0379222 A1 | 12/2020 | Yuki et al. |
| 2020/0382697 A1 | 12/2020 | Nagao |
| 2020/0382719 A1 | 12/2020 | Lee et al. |
| 2020/0394759 A1 | 12/2020 | Luo et al. |
| 2020/0402214 A1 | 12/2020 | Mukherjee et al. |
| 2020/0410646 A1 | 12/2020 | Lin et al. |
| 2021/0005123 A1 | 1/2021 | Valente et al. |
| 2021/0019892 A1 | 1/2021 | Zhou et al. |
| 2021/0027480 A1 | 1/2021 | Ren et al. |
| 2021/0036036 A1 | 2/2021 | Kobayashi et al. |
| 2021/0042949 A1 | 2/2021 | Horikawa et al. |
| 2021/0042950 A1 | 2/2021 | Wantland |
| 2021/0067848 A1 | 3/2021 | Kanazawa et al. |
| 2021/0075970 A1 | 3/2021 | Jain et al. |
| 2021/0082185 A1* | 3/2021 | Ziegler ................... G06T 15/50 |
| 2021/0092337 A1 | 3/2021 | Damberg et al. |
| 2021/0112154 A1 | 4/2021 | Rodriguez et al. |
| 2021/0329149 A1 | 10/2021 | Zhang et al. |
| 2021/0337100 A1 | 10/2021 | Wakamatsu et al. |
| 2021/0374925 A1 | 12/2021 | Finlayson et al. |
| 2022/0086309 A1 | 3/2022 | Kim et al. |
| 2022/0124241 A1 | 4/2022 | Manzari et al. |
| 2022/0132095 A1 | 4/2022 | Leung et al. |
| 2022/0150345 A1 | 5/2022 | Woo et al. |

FOREIGN PATENT DOCUMENTS

| | | |
|---|---|---|
| CN | 105378556 A | 3/2016 |
| CN | 107635093 A | 1/2018 |
| CN | 107948516 A | 4/2018 |
| CN | 108322639 A | 7/2018 |
| CN | 104967786 B | 3/2019 |
| CN | 107864336 B | 7/2019 |
| CN | 107566723 B | 11/2019 |
| CN | 107613203 B | 1/2020 |
| CN | 107172346 B | 2/2020 |
| CN | 107730460 B | 2/2020 |
| CN | 107749046 B | 2/2020 |
| CN | 107454332 B | 3/2020 |
| CN | 107613202 B | 3/2020 |
| CN | 110928291 A | 3/2020 |
| CN | 107194871 B | 4/2020 |
| CN | 111064895 A | 4/2020 |
| CN | 111192306 A | 5/2020 |
| CN | 108900750 B | 8/2020 |
| CN | 108234882 B | 9/2020 |
| CN | 111626924 A | 9/2020 |
| CN | 112150486 A | 12/2020 |
| CN | 108307106 B | 1/2021 |
| CN | 112270728 A | 1/2021 |
| CN | 108989678 B | 3/2021 |
| CN | 110913133 B | 3/2021 |
| CN | 112532882 A | 3/2021 |
| CN | 110769154 B | 5/2021 |
| CN | 111010514 B | 7/2021 |
| CN | 108335258 B | 8/2021 |
| CN | 111182211 B | 9/2021 |
| DE | 202017002874 U1 | 9/2017 |
| DK | 201670753 A1 | 1/2018 |
| DK | 201670627 A1 | 2/2018 |
| DK | 201770563 A1 | 2/2019 |
| DK | 179754 B1 | 5/2019 |
| EP | 3164992 A1 | 5/2017 |
| EP | 3012838 B1 | 1/2018 |
| EP | 3792738 A1 | 3/2021 |
| GB | 2520715 A | 6/2015 |
| GB | 2524956 B | 2/2017 |
| GB | 2582197 B | 12/2021 |
| IN | 201737003972 A | 5/2017 |
| IN | 201741009640 A | 9/2018 |
| IN | 201741029588 A | 2/2019 |
| IN | 201741031861 A | 3/2019 |
| IN | 201841004828 A | 8/2019 |
| IN | 201841008808 A | 9/2019 |
| IN | 201841012031 A | 10/2019 |
| IN | 201841025398 A | 1/2020 |
| IN | 201841034249 A | 3/2020 |
| IN | 201841040539 A | 5/2020 |
| JP | 2016142999 A | 8/2016 |
| JP | 6053287 B2 | 12/2016 |
| JP | 2016218205 A | 12/2016 |
| JP | 6188474 B2 | 8/2017 |
| JP | 6188531 B2 | 8/2017 |

(56) References Cited

FOREIGN PATENT DOCUMENTS

| | | |
|---|---|---|
| JP | 2017184182 A | 10/2017 |
| JP | 2017187743 A | 10/2017 |
| JP | 2017203792 A | 11/2017 |
| JP | 2018036510 A | 3/2018 |
| JP | 6320105 B2 | 5/2018 |
| JP | 6338353 B2 | 6/2018 |
| JP | 6351234 B2 | 7/2018 |
| JP | 6478711 B2 | 3/2019 |
| JP | 2019045520 A | 3/2019 |
| JP | 2019061228 A | 4/2019 |
| JP | 6587455 B2 | 10/2019 |
| JP | 2020171050 A | 10/2020 |
| JP | 6789833 B2 | 11/2020 |
| JP | 2020187549 A | 11/2020 |
| JP | 2020191624 A | 11/2020 |
| JP | 2020204628 A | 12/2020 |
| JP | 2021021798 A | 2/2021 |
| JP | 2021021800 A | 2/2021 |
| JP | 2021021801 A | 2/2021 |
| JP | 2021021802 A | 2/2021 |
| KR | 20150118004 A | 10/2015 |
| KR | 101842255 B1 | 3/2018 |
| KR | 20190080719 A | 7/2019 |
| KR | 102033601 B1 | 10/2019 |
| WO | 2004100206 A1 | 11/2004 |
| WO | 2016168783 A1 | 10/2016 |
| WO | 2018226264 A1 | 12/2018 |
| WO | 2020055613 A1 | 3/2020 |
| WO | 2020171492 A1 | 8/2020 |
| WO | 2020204291 A1 | 10/2020 |

OTHER PUBLICATIONS

Abdullah Abuolaim et al: "Learning to Reduce Defocus Blur by Realistically Modeling Dual-Pixel Data", Arxiv.Org, Cornell University Library, 201 Olin Library Cornell University Ithaca, NY 14853, Dec. 6, 2020.

European Search Report dated Sep. 1, 2022 for European Patent Application No. 22 16 5359.

* cited by examiner

IMAGING SYSTEM AND METHOD

CROSS-REFERENCE TO RELATED APPLICATION

This application claims the benefit of U.S. Provisional Patent Application Ser. No. 63/168,757, filed on Mar. 31, 2021, the disclosure of which is hereby incorporated by reference in its entirety as though fully set forth herein.

TECHNICAL FIELD

The present disclosure generally relates to imaging systems and methods, including imaging systems and methods that may be used in connection with smartphone cameras, such as to simulate full-frame cameras and lenses, for example.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

It may not be feasible or practical to incorporate a full-frame camera and lens into a smartphone, but it may be desirable to simulate one or more full-frame cameras and lenses for images captured via smartphone cameras.

Some imaging systems may not be configured to obtain sufficient depth information and/or may not effectively or efficiently utilize depth information in capturing and/or rendering images.

There is a desire for solutions/options that minimize or eliminate one or more challenges or shortcomings of imaging systems and methods. The foregoing discussion is intended only to illustrate examples of the present field and is not a disavowal of scope.

SUMMARY

In exemplary illustrative embodiments, a method of generating a digital image and/or modified depth information may include obtaining, via a first electronic sensor, a plurality of images of a target within a time period; selecting one or more pixels in a first image of the plurality of images; identifying corresponding pixels, that correspond to the one or more selected pixels, in one or more other images of the plurality of images, the one or more selected pixels and the corresponding pixels defining sets of reference pixels; determining disparities between respective sets of reference pixels; identifying two or more images of the plurality of images with optimal disparity according to the sets of the sets of reference pixels; determining disparities between some, most, or all pixels of the identified pair of images; combining the determined disparities from all pixels with depth information from a second electronic sensor to generate modified depth information; and/or generating a final digital image via the plurality of images and the modified depth information.

With illustrative embodiments, a mobile electronic device may include a first electronic sensor, a second electronic sensor, and/or an electronic control unit. The electronic control unit may be configured to obtain, via a first electronic sensor, a plurality of images of a target within a time period; select one or more pixels in a first image of the plurality of images; identify corresponding pixels, that correspond to the one or more selected pixels, in one or more other images of the plurality of images, the one or more selected pixels and the corresponding pixels defining sets of reference pixels; identify two or more images of the plurality of images with optimal disparity according to the sets of the sets of reference pixels; generate modified depth information; and/or generate a final digital image via the plurality of images and/or the modified depth information.

With some illustrative embodiments, generating modified depth information may include determining disparities between the identified two or more images; combining the determined disparities with depth information from a second electronic sensor; upscaling the combined disparity and depth information; shifting pixels of an image of the identified two or more images according to the upscaled combined disparity and depth information; determining remaining disparities after the shifting; combining the remaining disparities with the depth information; and/or upscaling the remaining combined disparity and depth information. The modified depth information may include the upscaled remaining combined disparity and depth information. An imaging system may include the mobile electronic device.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to illustrative embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Full-frame cameras and lenses may provide a bokeh for at least some images. For example, a bokeh may include the aesthetic effects of the blurring of out-of-focus portions of an image. A variety of components of full-frame cameras and lenses, such as aperture blades, optical vignetting, spherical aberrations, and/or chromatic aberrations, among others, may impact how a camera/lens renders a bokeh. With full-frame cameras and lenses, a bokeh may be created before the light ray even hits the sensor, which may maintain a consistent grain on the in-focus and out-of-focus areas of an image.

Smartphone cameras usually have much smaller image sensors having significantly less surface area to capture light than full-frame cameras and may produce an almost infinite depth-of-field that may render background images almost as sharp as the subject/target itself (e.g., so no part of the image appears out of focus). While some smartphone cameras have modes that blur out background portions of an image (e.g., a portrait mode), the blurring does not simulate the optical effects associated with a full-frame camera and lens combination, such as optical vignetting, chromatic aberrations, spherical aberrations, and/or various other characteristics of bokeh that photographers may use to achieve a particular look in their art. Instead, the smartphone blurring may be uniform and totally grain free, which may provide a plastic look to the blurring, with little or no variation for the viewer's eye.

Some smartphone cameras (and images generated therefrom) may suffer with poor segmentation between the foreground and background. Smartphones may typically rely on a depth map with resolution that is relatively low, which may result in imprecise edges and depth estimation errors, which may cause sharp zones in the background, or blurred zones on the subject/target, and may be particularly evident when capturing a moving scene. To provide improved image quality relative to other designs, embodiments of the current disclosure may, among other things, be configured to obtain enhanced/modified depth/disparity information, change the intensity or focus of an object based on depth (e.g., distance from the smartphone/sensors), and/or generate an enhanced/modified image based, at least in part, on the enhanced/modified depth/disparity information.

Figure 1:
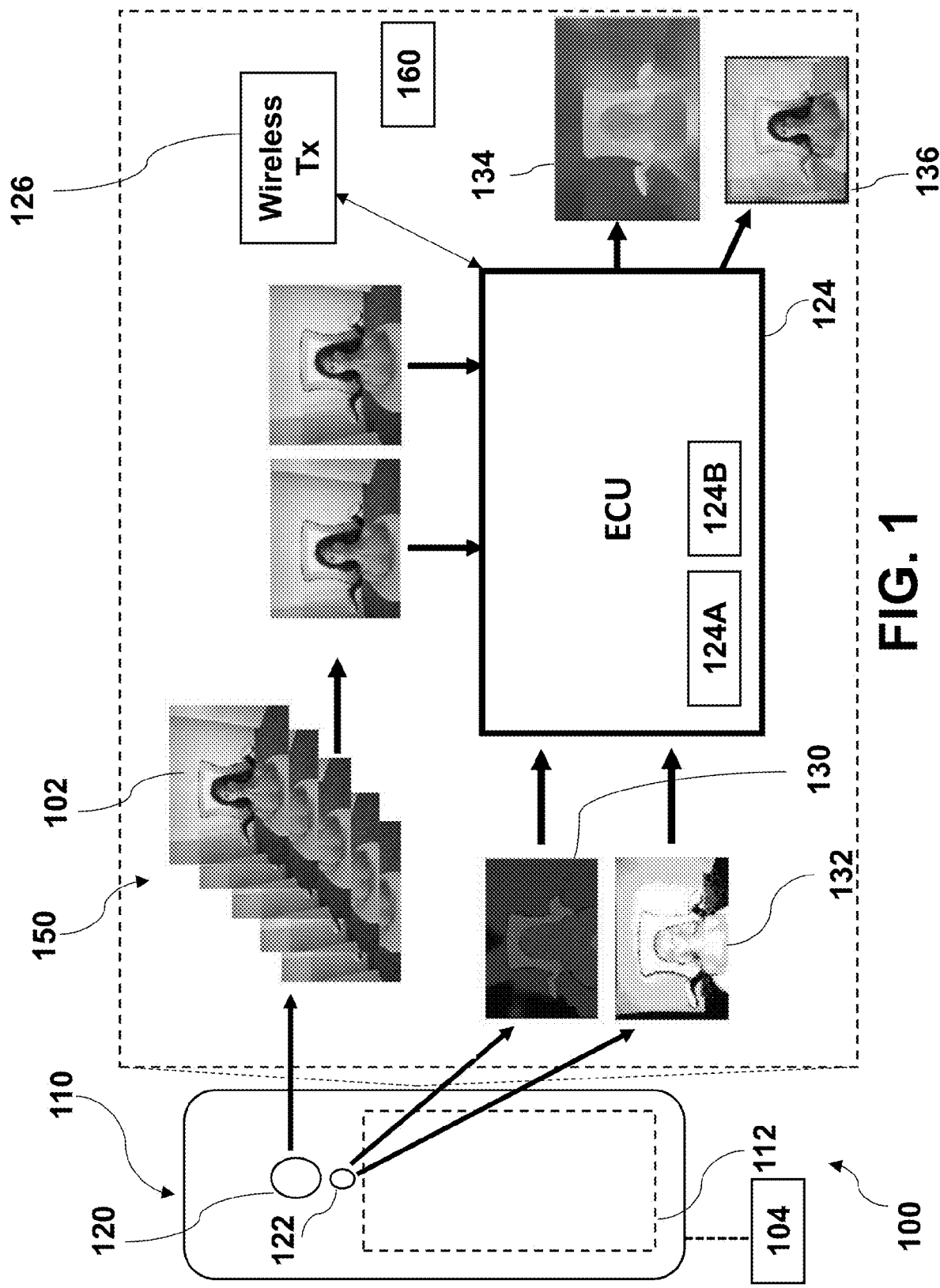
FIG. 1-3 are representations of exemplary embodiments of imaging systems and methods.

In illustrative exemplary embodiments, such as generally illustrated in FIG. 1, an imaging system 100 may include a mobile electronic device 110 (e.g., a smartphone) that may include a first electronic sensor 120, a second electronic sensor 122, and/or an electronic control unit 124 (ECU). The mobile electronic device 110 may, for example, include a cellular transceiver/radio/modem 126 that may communicate with the ECU 124 and/or a cellular network. The electronic control unit 124 may include and/or be connected to a processor 124A and/or a memory 124B. The mobile electronic device 110 may be relatively thin. For example and without limitation, the mobile electronic device 110 may be about 1 inch (25.4 mm) or less, or about 0.5 inches (12.7 mm) or less thick.

With illustrative embodiments, the mobile electronic device 110 may be configured to simulate one or more effects of one or more full-frame camera and lens combinations, such as bokehs associated with such combinations. Effectively simulating a full-frame camera and lens bokeh may include obtaining accurate depth information, such as on a pixel-by-pixel basis (e.g., instead of applying uniform blurring). Accurate depth information may be provided via an enhanced depth map 134.

Figure 2:
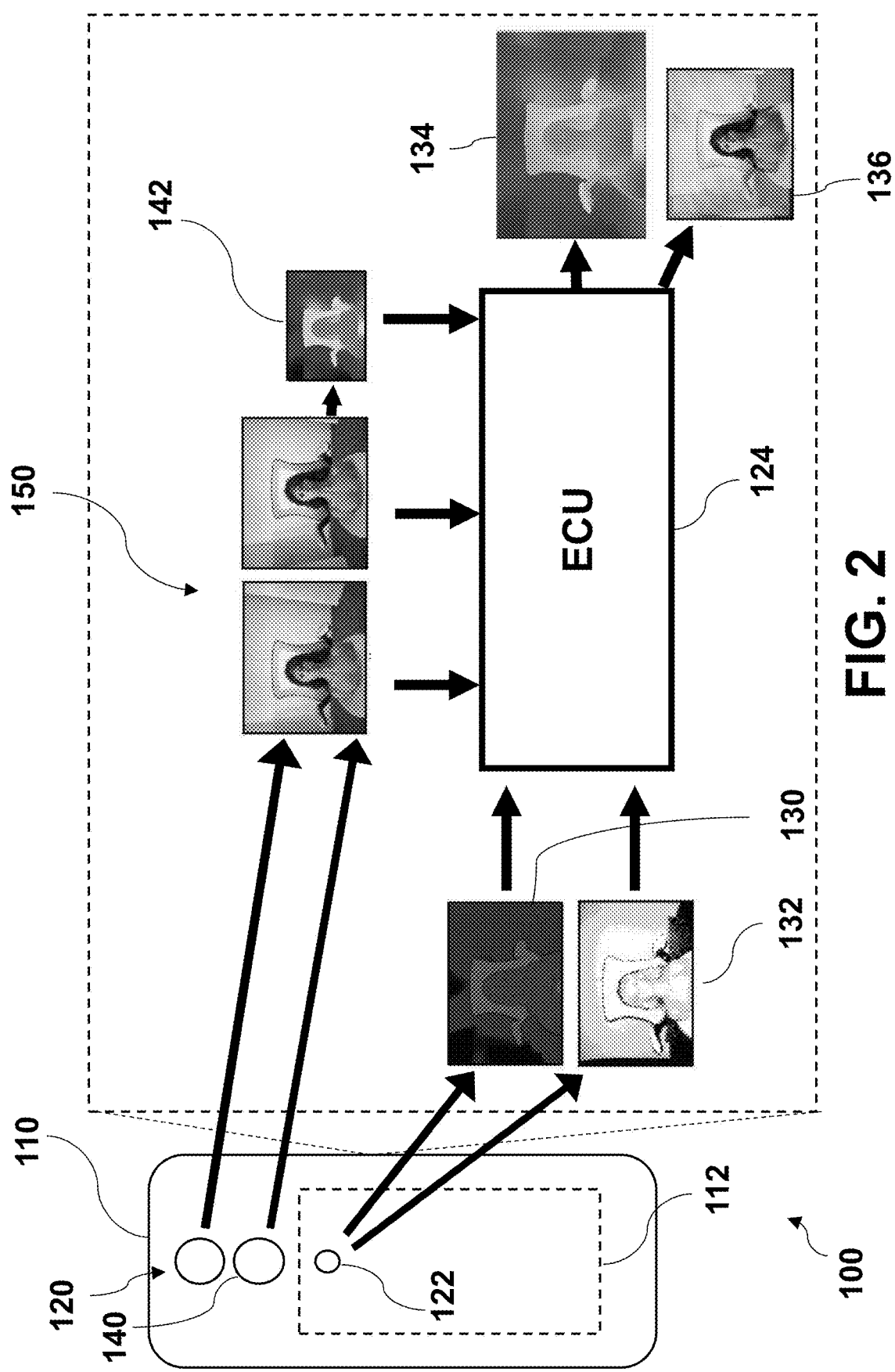

With exemplary embodiments, such as generally illustrated in FIG. 1, a first electronic sensor 120 may be configured to obtain image information associated with a target. For example and without limitation, the first electronic sensor 120 may include a color sensor (e.g., an RGB sensor). The image information may include color information associated with the target, such as RGB intensity information. In some embodiments, such as generally illustrated in FIG. 2, a first electronic sensor 120 may include an additional sensor portion 140, such as a second color sensor (e.g., a second RGB sensor).

In illustrative embodiments, a second electronic sensor 122 may be configured to obtain initial depth information associated with the target (e.g., may include a depth/distance sensor). For example and without limitation, a second electronic sensor 122 may include a time-of-flight (TOF) sensor (see, e.g., FIGS. 1 and 2). For example, the second electronic sensor 122 sensor may emit a signal and determine a distance between the second sensor 122 and an object according to the amount of time between when the signal was emitted and when the signal returns to the second sensor 122 after being reflected by the object. A target/scene may include one or a plurality of physical objects that may be disposed at different distances from the mobile electronic device 110. The second electronic sensor 122 sensor may be configured to obtain depth information associated with some or all objects of a target. For example, the second electronic sensor 122 may be configured to obtain initial depth information, such as on a pixel-by-pixel basis. The depth information may include depth data 130 (e.g., feet, meters, etc. for some or all pixels) and/or a confidence map 132 (e.g., confidence values on a scale of 0 to 1 for some or all pixels). The ECU 124 may be configured to provide an enhanced depth map 134 and/or a final image 136, which may be obtained, at least in part, according to the enhanced depth map 134.

Figure 3:
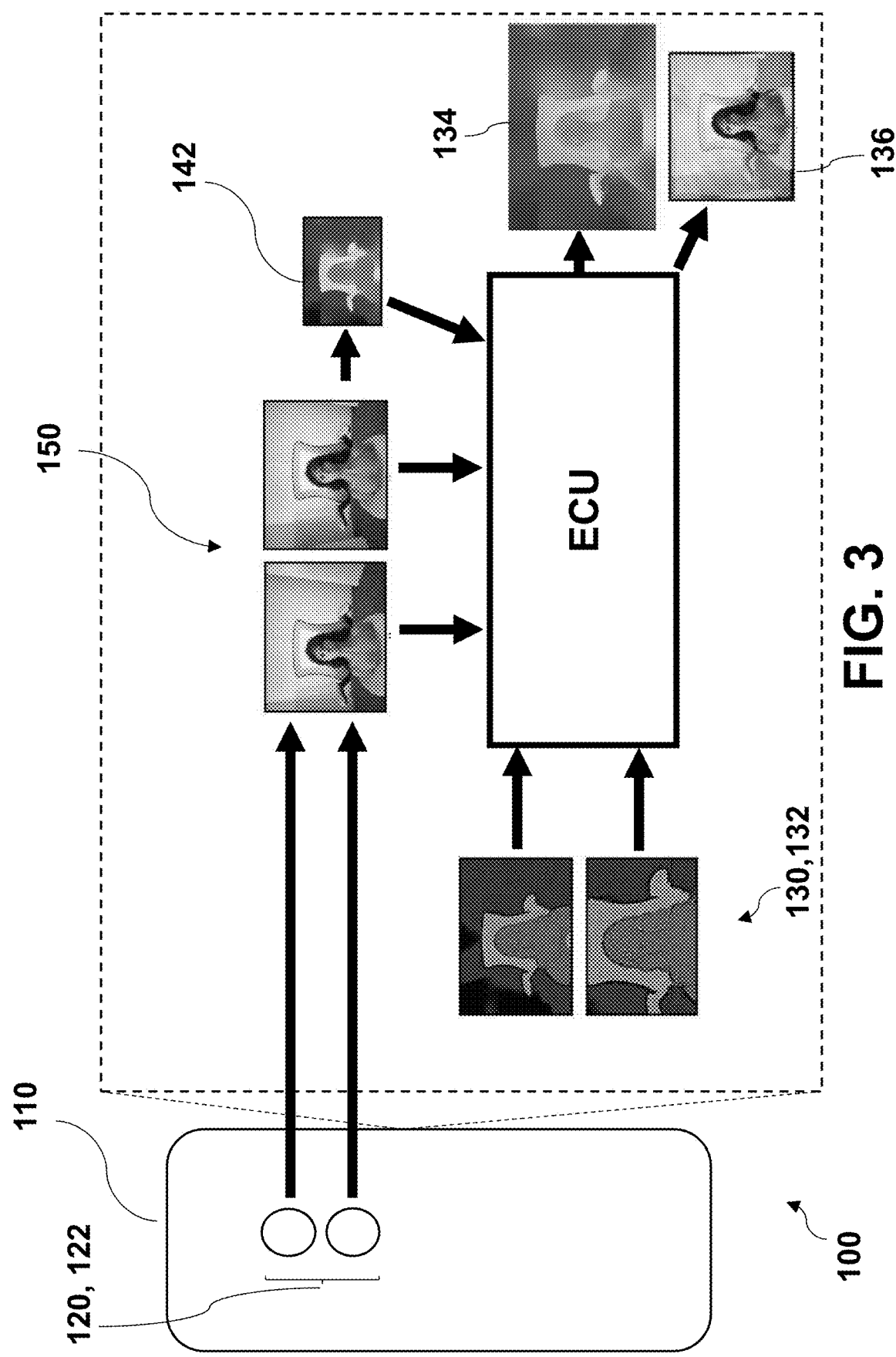

With exemplary embodiments, such as generally illustrated in FIG. 3, a second electronic sensor 122 may, additionally or alternatively, include one or more phase detection autofocus (PDAF) sensors. A PDAF sensor may, at least in some circumstances, be connected to and/or integrated with the first electronic sensor 120. For example and without limitation, the first electronic sensor 120 may include a first RGB sensor that may include a first PDAF sensor of the second electronic sensor 122, and/or the first electronic sensor 120 may include a second RGB sensor that may include a second PDAF sensor of the second electronic sensor 122.

In exemplary embodiments, a method 1000 of operating an imaging system 100 may be configured to generate a digital image, obtain enhanced disparity information, obtain enhanced depth information, and/or generate an enhanced depth/disparity map. Disparity may be utilized for determining depth. For example, higher disparity may correspond to closer portions of a scene/image and lower disparity may correspond to farther portions of the scene/image.

Figure 4:
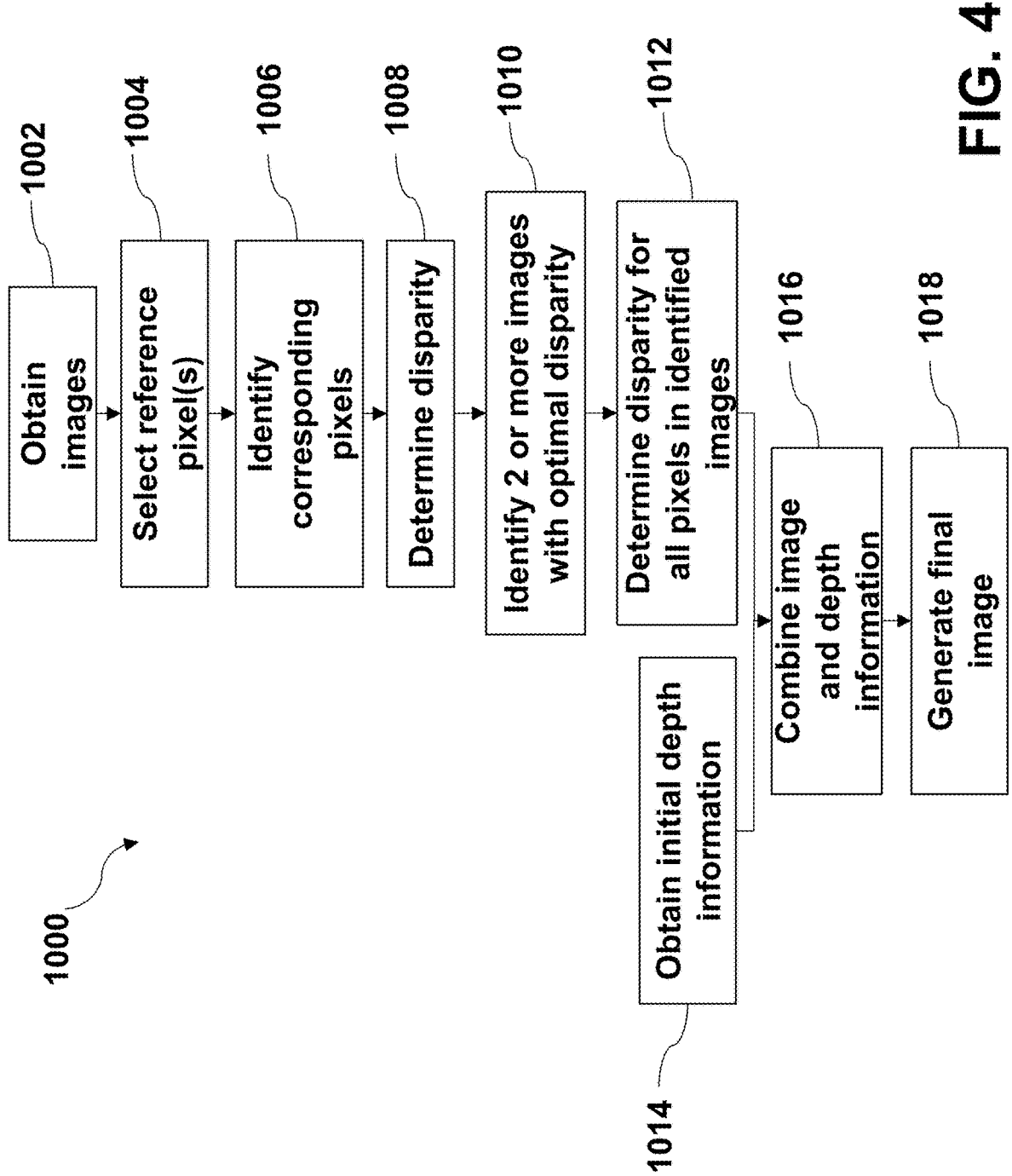
FIG. 4 is flow diagram of an exemplary embodiment of an imaging method.
Figure 5:
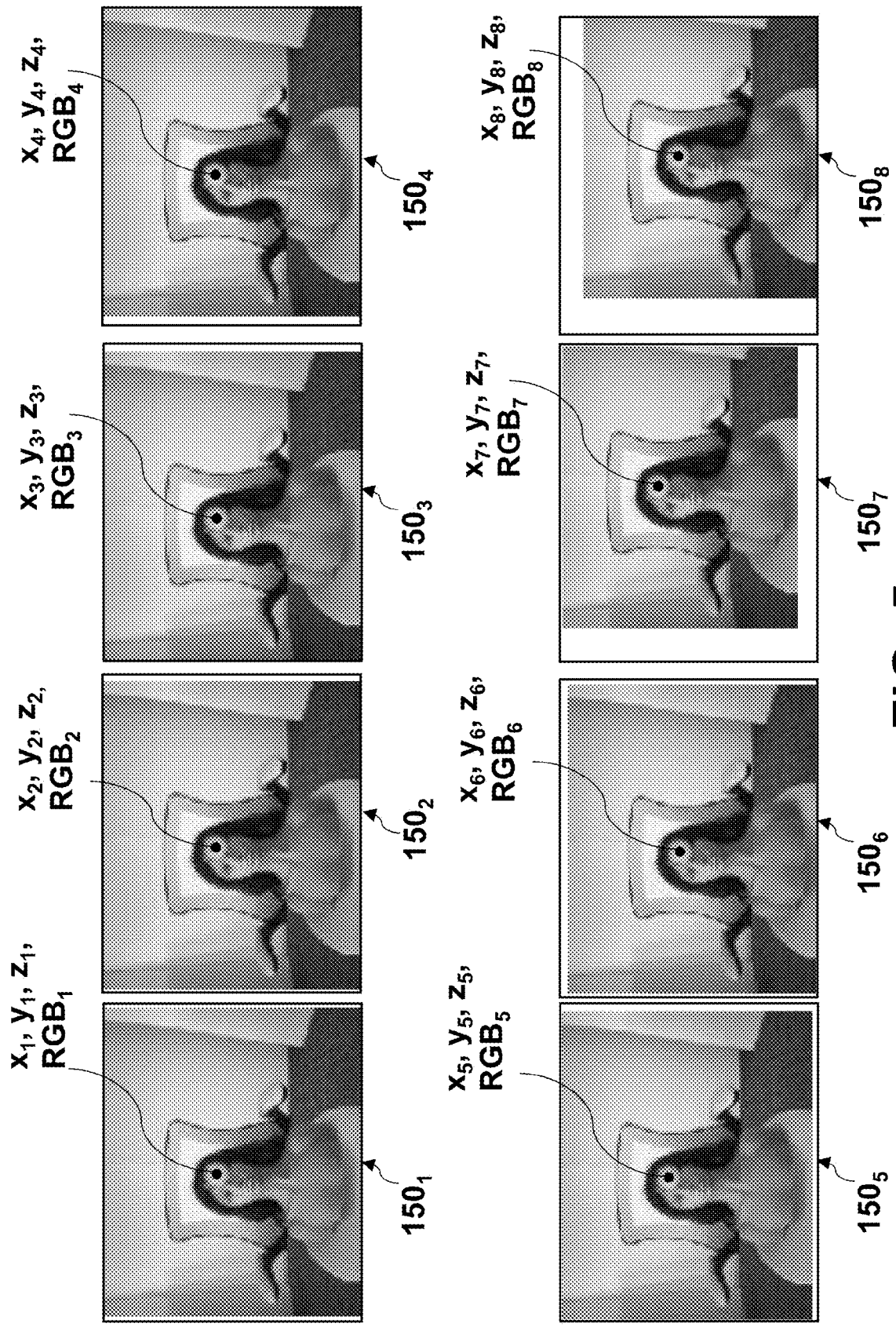
FIG. 5 is a representation of a plurality of images with respective reference pixels identified in connection with an exemplary embodiment of an imaging system.

With illustrative embodiments, such as generally illustrated in FIG. 4, a method 1000 of operating an imaging system 100 may include obtaining a plurality of images 150 (see, e.g., images 150$_{1-8}$ in FIG. 5) of a target 102 within a time period (block 1002), such as via a first electronic sensor 120 of a mobile electronic device 110. The time period may, for example and without limitation, be about 1 second or less. For example, the images 150$_{1-8}$ may be obtained via an image burst and the images 150$_{1-8}$ may be captured at respective times (e.g., one after the other). A target 102 may, for example, include a scene intended to be captured and rendered in a digital image. The method 1000 may include selecting one or more pixels in a first image 150$_1$ of the plurality of images 150 (block 1004). The selected pixels of an image may include associated location information (e.g., $X_{1-8}$, $Y_{1-8}$, $Z_{1-8}$) and/or associated color information (e.g., $RGB_{1-8}$). The associated color information RGB of a pixel may be at least somewhat unique relative to other pixels in the first image $150_1$, particularly if the image(s) 150 are downscaled. The selected pixels may be selected automatically, such as via an ECU 124 of the mobile electronic device 110. For example and without limitation, the selected pixels may include a pixel in the center of the first image $150_1$, a closest pixel (e.g., to the mobile electronic device 110), pixels on one or more portions of a face of a person or animal in the first image $150_1$, and/or pixels at various depths. In some circumstances, the mobile electronic device 110 may provide the selected pixels, such as via a range finder.

With illustrative exemplary embodiments, the method 1000 may include identifying corresponding pixels ($X_{2-8}$, $Y_{2-8}$, $Z_{2-8}$) that correspond to each selected pixel ($X_1$, $Y_1$, $Z_1$) in one or more other images (e.g., images $150_{2-8}$) of the plurality of images 150 (block 1006). The corresponding pixels may, for example, include substantially the same color information as a respective selected pixel and may or may not include the same location information. The ECU 124 may be configured to automatically determine the corresponding pixels, such as by searching for the pixels in other images $150_{2-8}$ that include color information that is most similar (or the same) as the selected pixels. The ECU 124 may utilize lower resolution and/or downscaled versions of the plurality of images 150 for identifying corresponding pixels in the other images. The selected pixels of the first image $150_1$ and the corresponding pixels in the other images $150_{2-8}$ may define and/or be referred to as respective sets of reference pixels. Once the corresponding pixels are identified, the ECU 124 may align the images based on the corresponding pixels (e.g., to alignments that minimize total disparity) and may remove and/or reduce distortions, such as distortions that may result from rotational movement (e.g., not translational movement). For example, rotational movement may not be utilized for determining depth/disparity. Once the distortions are removed/reduced, a significant amount (e.g., most) of the remaining disparity may correspond to hand movements of a user during the period.

In illustrative embodiments, the method 1000 may include determining disparities between respective pairs of the reference pixels of different sets/images, such as via the ECU 124 (block 1008). Determining disparities may include determining disparities in two dimensions, such as by how many pixels a reference pixel is shifted from a first image $150_1$ to another image $150_{2-8}$. Two dimensions may include an X-value (e.g., left-right pixel shift) and a Y-coordinate (e.g., top-bottom pixel shift). At least some disparities may, in some circumstances, correspond to movements (e.g., natural tremors) of a user's hand during the period. The method 1000 may include identifying two or more images 150 with respective sets of reference pixels that have an optimal/desired disparity (block 1010). The optimal/desired disparity may be at or above a minimum disparity threshold that may correspond to an amount of disparity sufficient for determining depth. For example, the optimal/desired disparity may correspond to an amount of disparity that allows for differentiation between levels of depth of an image. The optimal/desired disparity may be determined, at least in part, according to depth information from a depth sensor, such as may be included with the second electronic sensor 122. The optimal/desired disparity may be below a maximum threshold, such as to filter out certain images, such as images with occlusion that exceeds an occlusion threshold (e.g., an image that does not include enough of the same scene) and/or outlier image, such as if a mobile electronic device 110 is dropped, a sensor malfunctions, or some other error occurs.

In illustrative embodiments, the method 1000 may include determining disparity between some, most, or all of the pixels of the two or more identified images 150 with optimal/desired disparity (block 1012).

With exemplary embodiments, the method 1000 may include obtaining depth information of the target, such as via a second electronic sensor 122 (block 1014). The second electronic sensor 122 may, for example and without limitation, include a TOF sensor.

In exemplary embodiments, the method 1000 may include combining information from the two or more identified images 150 with depth information from the second electronic sensor 122, such as to generate a modified/enhanced depth map 134 (block 1016). The initial depth information, such as the depth data, may be relatively low resolution. Combining the initial depth information with disparity information from the two identified images 150 may improve such resolution and may result in the modified depth map being more accurate/complete than if only depth data from the second electronic sensor 122 were used.

With illustrative embodiments, the method 1000 may include generating a final digital image 136 via the plurality of images 150 and the modified/enhanced depth map 134 (block 1018). In some circumstances, the final digital image 136 may or may not be specifically configured for viewing on a display 112 of the mobile electronic device 110. Instead, the final digital image 136 may be configured for printing by a printer 104 on a tangible medium (e.g., paper, photo paper, canvas, metal, plastic, ceramic, etc.) such that aspects of the printed image are clear from a distance and up close. For example, a printer 104 may be configured to receive (e.g., via wired connection, wireless connection, removable media, etc.) information from the mobile electronic device 110, and the information may include the final digital image 136. The method 1000 may include printing the final digital image 136 via the printer 104 on paper or physical media, such as photo paper.

In exemplary embodiments, the method 1000 may not rely on a gyroscope 160 of the mobile electronic device 110. In other embodiments, the method 1000 may utilize information from a gyroscope 160, such as to convert (e.g., directly) disparity information to depth information.

FIGS. 6-10 generally illustrate exemplary embodiments of methods of obtaining depth information and combining depth information with color information.

Figure 6:
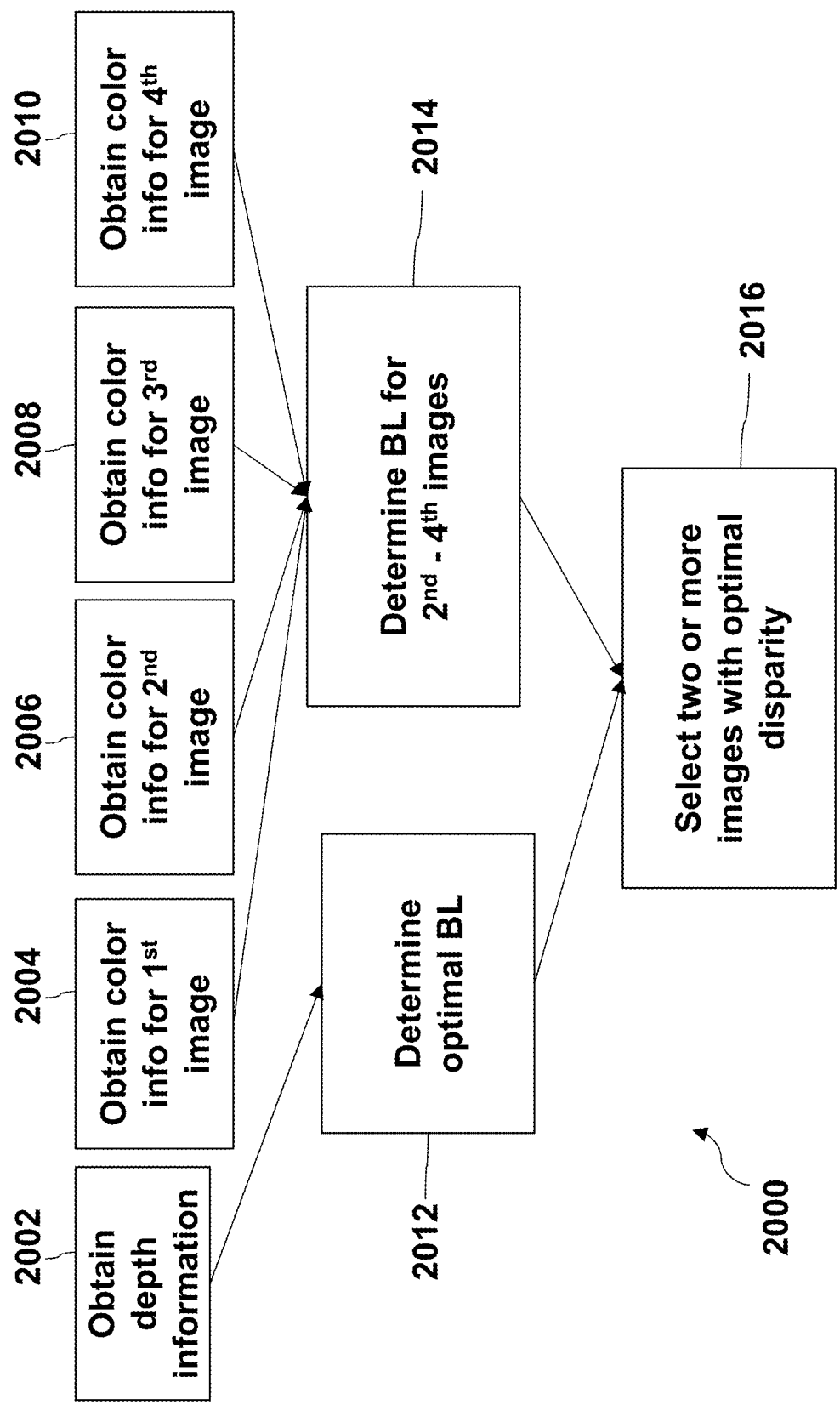
FIGS. 6-10 are flow diagrams of portions of exemplary embodiments of imaging methods.

FIG. 6 generally illustrates an exemplary embodiment of a method 2000 of selecting of two (or more) images 150 with optimal disparity, such as generally described above in connection with blocks 1002-1010 of method 1000 (see, e.g., FIG. 4). A baseline BL may correspond to an expected or average amount of hand shake/tremor between image captures. The method 2000 may include obtaining depth information, such as for a first image $150_1$ captured at a first time (block 2002), obtaining color information RGB from the first image $150_1$ at the first time (block 2004), obtaining color information RGB from a second image $150_2$ captured at a second time (block 2006), obtaining color information RGB from a third image 1503 captured at a third time (block 2008), obtaining color information RGB from a fourth image 1504 captured at a fourth time (block 2010), and/or obtaining color information RGB from one or more additional images 150 captured at other times (e.g., images $150_{5-8}$). The method 2000 may include determining an optimal baseline BL, such as according to the obtained depth information (block 2012). The method 2000 may include determining a BL for the images $150_{2-4}$ after the first image $150_1$ (block 2014), which may include deghosting of moving objects. The method 2000 may include identifying/selecting two images of the plurality of images 150 with optimal disparity (block 2016). The output of block 1010 of the method 1000 may correspond to the output of block 2016.

Figure 7:
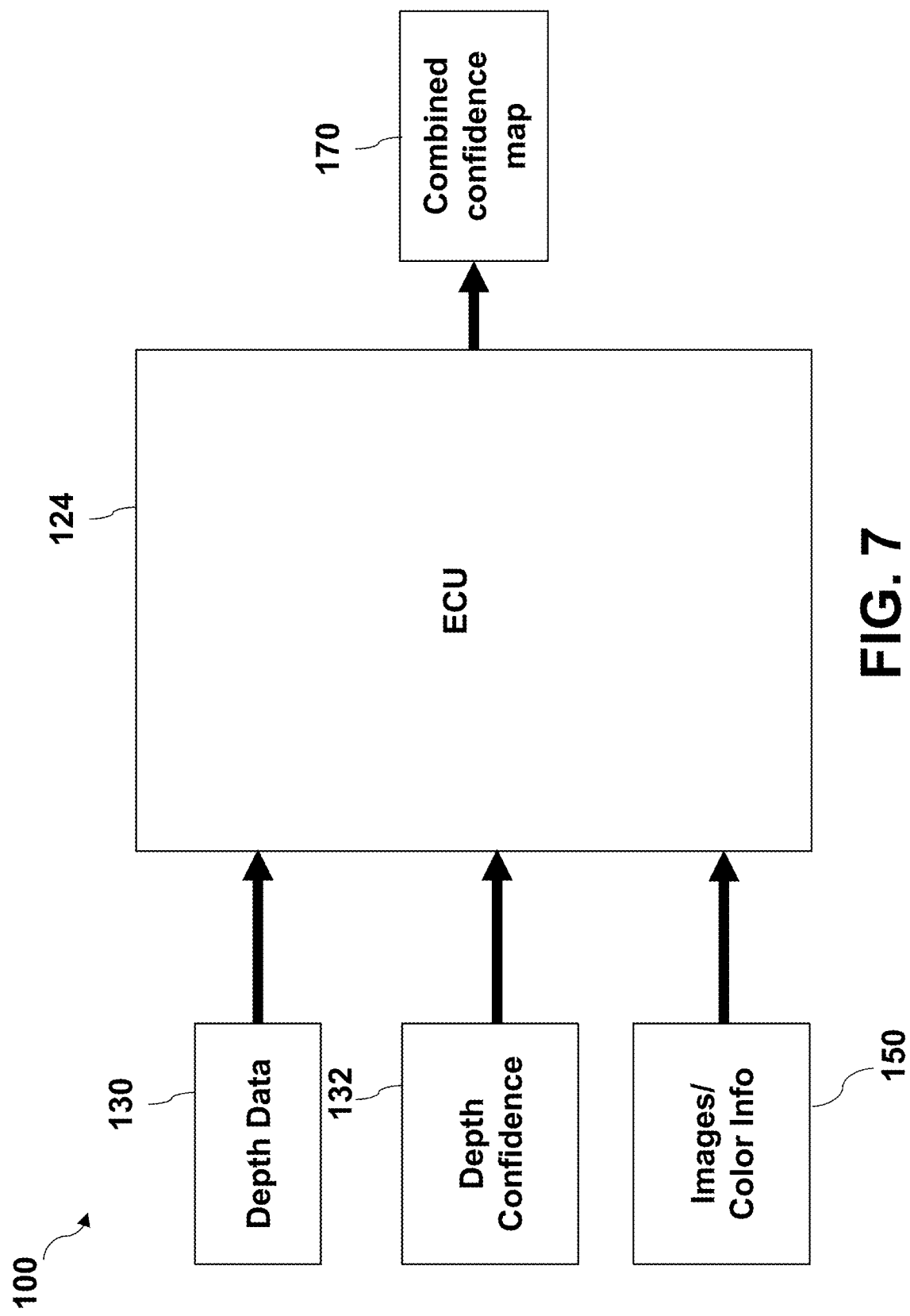

With exemplary embodiments, such as generally illustrated in FIG. 7, combining depth information and image information (e.g., in block 1016 of method 1000, see FIG. 4) may include obtaining an enhanced confidence map 170. A depth sensor, such as may be included with the second electronic sensor 122, may output depth data 130 and a confidence map 132 (e.g., based on how many photons are received). The ECU 124 may use the depth data 130 and/or the confidence map 132 in conjunction with one or more images 150 and/or color information thereof, which may be obtained via the first electronic sensor 120, to generate a combined confidence map 170. For example, the ECU 124 may look for the color of pixels that the confidence map 132 identifies as high confidence. For example, if the confidence is high for pixels that are substantially black (and wouldn't be expected to actually reflect significant amounts of light), the ECU 124 may ignore or provide less weight to the confidence for that pixel. Additionally or alternatively, if the confidence for a pixel is low or zero but the color of the pixel is relatively light (and would be expected to reflect significant amounts of light), the ECU 124 may use the depth data 130 to confirm that the confidence is low because the pixel corresponds to a portion of the scene that is far away. Additionally or alternatively, if confidence is missing (which may, for example, occur for low or 0 confidence), the ECU 124 may generate an estimated confidence based on the color information for the pixel (e.g., higher for lighter pixels and lower for darker pixels).

Figure 8:
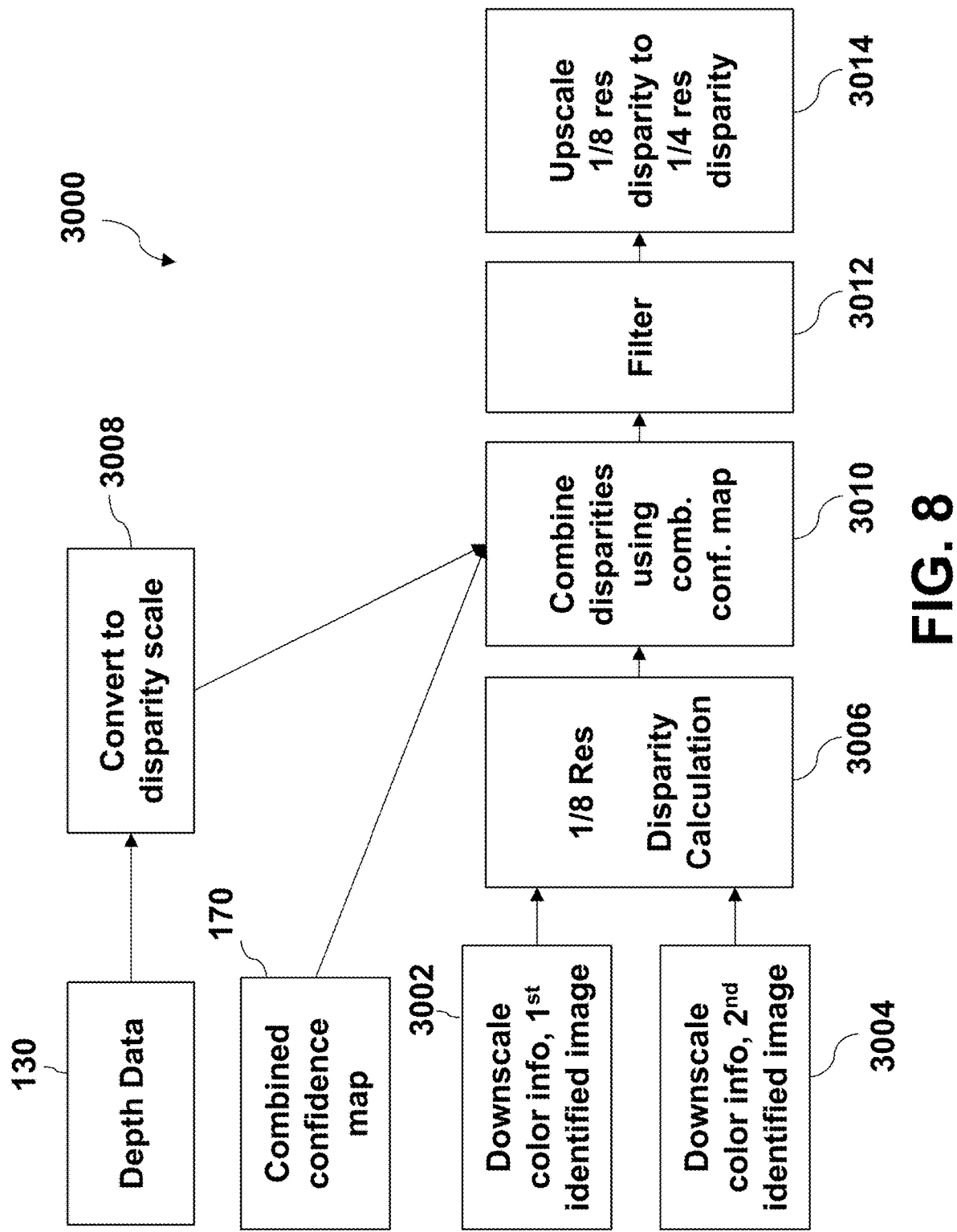
Figure 9:
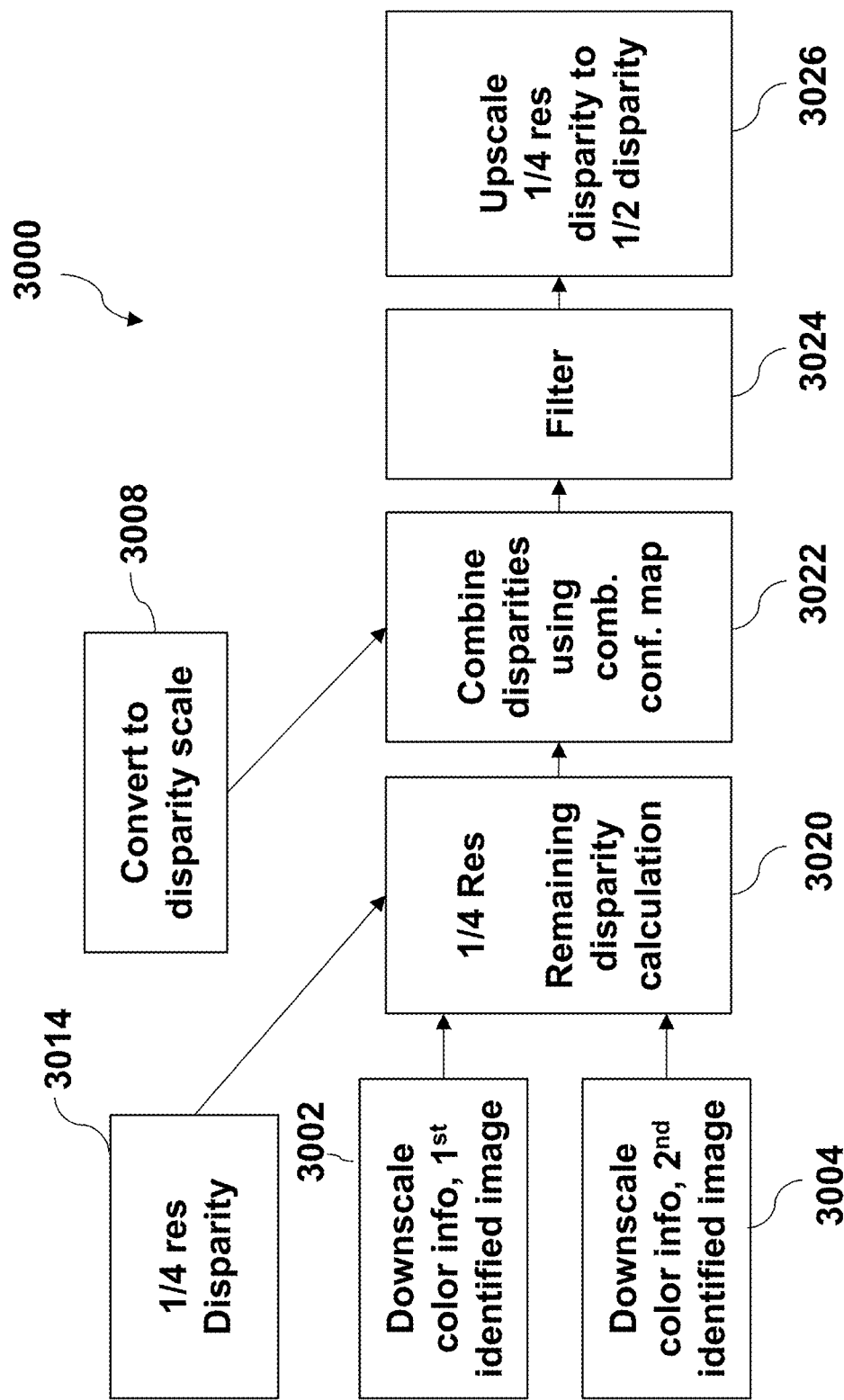
Figure 10:
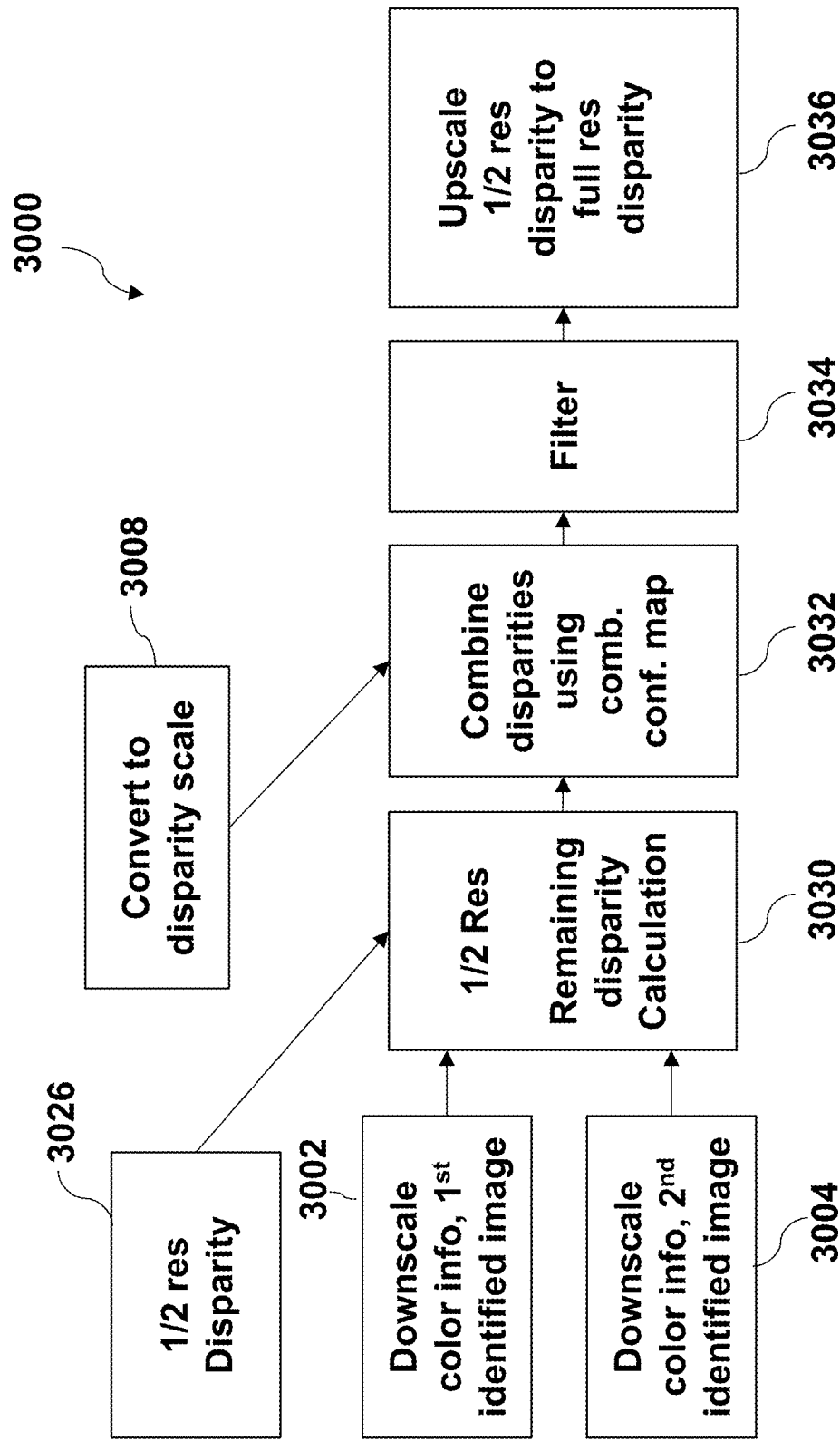

In illustrative embodiments, such as generally illustrated in FIGS. 8-10, an ECU 124 may be configured to conduct a plurality of depth iterations 3000. As generally illustrated in FIG. 8, a first iteration may include downscaling the identified images 150 with optimal disparity (blocks 3002, 3004) (e.g., images that have optimal/desired disparity), such as to ⅛ resolution. The downscaling may tend to remove noise. The ECU 124 may then conduct a disparity calculation between the downscaled images (block 3006), such as via using pixel kernels (e.g., 3×3 kernel, 5×5 kernel, etc.) for some pixels or each pixel, where the pixel of interest may be at the center of the kernel. Color information of kernels may be more unique than individual pixels, which may facilitate locating corresponding pixels (e.g., and reduce computational resources used). The ECU 124 may convert the depth data 130 to disparity based on the maximum disparity of the identified images (block 3008) (e.g., max depth scaled to equal maximum disparity, minimum depth scaled to minimum disparity, which may generally be set to 0). The ECU 124 may combine disparity information from the second electronic sensor 122 (e.g., converted from depth information) with the disparity information determined between the identified images based, at least in part, on the combined confidence map 170 (block 3010). For example, if the combined confidence for a pixel is high, the ECU 124 may utilize and/or weigh more heavily the converted disparity data (e.g., from block 3008). If the combined confidence for a pixel is low, the ECU 124 may utilize and/or weigh more heavily the determined disparity data (e.g., from block 3006). For medium confidence, the ECU 124 may use a weighted average of converted disparity data and determined disparity data.

With exemplary embodiments, the ECU 124 may filter the combined disparity data (block 3012), which may be similar to de-noising. The filtering (e.g., guided filtering) may identify pixels with the same or highly similar color information, which would likely have the same disparity, and may remove and/or modify the disparity information for pixels with disparity information that is significantly different than other pixels of the same or similar color. The ECU 124 may upscale the combined disparity (e.g., after filtering), such as from ⅛ resolution to ¼ resolution (block 3014).

In exemplary embodiments, such as generally illustrated in FIGS. 9 and 10, the ECU may conduct additional iterations, such as until full resolution is obtained. In the additional iterations, the ECU 124 may utilize the disparity information from the previous iteration to shift pixels of the second image and any additional images and determine what disparities remain relative to the first image (blocks 3020, 3030). The images may be downscaled prior to determining the remaining disparities. For example, block 3002 and/or block 3004 may be repeated, and may apply a different scaling factor, such as ¼ instead of ⅛ for a second iteration (FIG. 9), and/or ½ instead of ⅛ for a third iteration (FIG. 10).

In illustrative embodiments, the ECU 124 may use the remaining disparity to modify the disparity information from the previous iteration. The ECU 124 may then combine, filter, and/or upscale the modified disparity information in the same or a similar manner as the first iteration (blocks 3022, 3024, 3026 and blocks 3032, 3034, 3036, which may be conducted in a similar manner as blocks 3010-3014). The modified/enhanced disparity information from the final iteration (e.g., full resolution) may be an output of the method 3000. The modified/enhanced disparity information may, in some instances, be converted to depth information and/or an enhanced depth map depth map 134, such as by using a conversion or stretch factor that was used to convert the depth information from the second electronic sensor 122 to disparity in block 3008. The ECU 124 may utilize the modified/enhanced disparity/depth map 134 to generate a final image 136 (see, e.g., block 1018).

With illustrative embodiments, the ECU 124 may be configured to generate a depth estimation 142 using a neural network. The neural network may generate the depth estimation from an input of one or more RGB images 150. In some circumstances, the neural network depth estimation may be consistent on objects in a scene, but it may report incorrect depth values for various portions of the same object. For example, a tree at 3 meters (9.84 feet) might be reported (e.g., incorrectly) by the network as being at 2 meters (6.56 feet), but it may report the 2 meters on all pixels that reside within the tree. The ECU 124 may use the depth data from the second electronic sensor 122 (e.g., ToF, disparity, and/or a PDAF sensors) to assign real world depth values to the next neighbor (NN) on a per object basis.

In examples, an ECU (e.g., ECU 124) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of generating a digital image, the method comprising:
obtaining, via a first electronic sensor, a plurality of images of a target within a time period;
selecting one or more pixels in a first image of the plurality of images;
identifying corresponding pixels, that correspond to the one or more selected pixels, in one or more other images of the plurality of images, the one or more selected pixels and the corresponding pixels defining sets of reference pixels;
identifying two or more images of the plurality of images with optimal disparity according to the sets of reference pixels;
generating modified depth information via the identified two or more images;
generating a final digital image via the modified depth information;

wherein generating the modified depth information includes:
  determining disparity information for the identified two or more images; and
  combining the determined disparity information with depth information from a second electronic sensor;
wherein generating the modified depth information includes downscaling the two or more identified images; and
determining the disparity information for the identified two or more images includes determining disparities via the downscaled versions of the two or more identified images;
wherein generating the modified depth information includes upscaling the combined disparity and depth information;
wherein generating the modified depth information includes:
  shifting pixels of an image of the identified two or more images according to the upscaled combined disparity and depth information; and
  determining remaining disparity information after the shifting;
wherein generating the modified depth information includes:
  combining the remaining disparity information with the depth information; and
  upscaling the remaining combined disparity and depth information; and
  wherein the modified depth information includes the upscaled remaining combined disparity and depth information.

2. The method of claim 1, wherein the one or more selected pixels each include associated location information and color information.

3. The method of claim 2, wherein the associated location information includes two-dimensional location information.

4. The method of claim 2, wherein the associated location information includes three-dimensional location information.

5. The method of claim 1, wherein identifying the two or more images includes determining two-dimensional disparities between respective pairs of the reference pixels.

6. The method of claim 1, wherein identifying the two or more images includes determining three-dimensional disparities between respective pairs of the reference pixels.

7. The method of claim 1, wherein the optimal disparity is a minimum disparity that can be utilized for distinguishing between depth levels.

8. The method of claim 7, wherein the optimal disparity is less than a maximum threshold to filter out images with occlusion that exceeds an occlusion threshold and/or outlier images caused by dropping a mobile electronic device or a sensor malfunction.

9. The method of claim 1, including obtaining depth information via a second electronic sensor;
  wherein the depth information includes depth data and a confidence map; and
  the modified depth information is different than the depth information obtained via the second electronic sensor.

10. The method of claim 1, wherein the modified depth information includes a modified depth map and/or a modified disparity map.

11. The method of claim 1, wherein generating the modified depth information includes filtering the combined disparity and depth information.

12. The method of claim 1, wherein the remaining disparity information is determined via pixel kernels.

13. A mobile electronic device, comprising:
a first electronic sensor;
a second electronic sensor; and
an electronic control unit;
wherein the electronic control unit is configured to:
obtain, via the first electronic sensor, a plurality of images of a target within a time period;
select one or more pixels in a first image of the plurality of images;
identify corresponding pixels, that correspond to the one or more selected pixels, in one or more other images of the plurality of images, the one or more selected pixels and the corresponding pixels defining sets of reference pixels;
identify two or more images of the plurality of images with optimal disparity according to the sets of reference pixels;
generate modified depth information; and
generate a final digital image via the modified depth information;
wherein generating modified depth information includes:
  determining disparity information for the identified two or more images;
  combining the determined disparity information with depth information from the second electronic sensor;
  upscaling the combined disparity and depth information;
  shifting pixels of an image of the identified two or more images according to the upscaled combined disparity and depth information;
  determining remaining disparity information after the shifting;
  combining the remaining disparity information with the depth information; and
  upscaling the remaining combined disparity and depth information; and
  wherein the modified depth information includes the upscaled remaining combined disparity and depth information.

* * * * *